United States Patent
Dai et al.

(10) Patent No.: US 11,427,748 B2
(45) Date of Patent: Aug. 30, 2022

(54) MUSSEL BIONIC GEL COMPOSITION, SELF-REPAIRING GEL, PROFILE CONTROL AND WATER PLUGGING AGENT, METHOD FOR PREPARING SELF-REPAIRING GEL, AND USE

(71) Applicant: China University of Petroleum (East China), Qingdao (CN)

(72) Inventors: Caili Dai, Qingdao (CN); Lin Li, Qingdao (CN); Jiawei Liu, Qingdao (CN); Zhongzheng Xu, Qingdao (CN); Guang Zhao, Qingdao (CN); Mingwei Zhao, Qingdao (CN); Yining Wu, Qingdao (CN); Yongpeng Sun, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 17/528,370

(22) Filed: Nov. 17, 2021

(65) Prior Publication Data
US 2022/0154064 A1 May 19, 2022

(30) Foreign Application Priority Data
Nov. 17, 2020 (CN) .......................... 202011290186.0

(51) Int. Cl.
| C09K 8/512 | (2006.01) |
| C08F 220/56 | (2006.01) |
| C09K 8/516 | (2006.01) |

(52) U.S. Cl.
CPC ............ *C09K 8/512* (2013.01); *C08F 220/56* (2013.01); *C09K 8/516* (2013.01); *C08F 2810/20* (2013.01); *C08F 2810/50* (2013.01)

(58) Field of Classification Search
None
See application file for complete search history.

(56) References Cited

U.S. PATENT DOCUMENTS

| 9,670,386 | B2 * | 6/2017 | Reyes ..................... C09J 101/08 |
| 10,683,726 | B1 * | 6/2020 | Al-Mulhem ......... C09K 8/5083 |
| 2013/0312961 | A1 * | 11/2013 | Reyes .................... C09K 8/514 |
| | | | 166/279 |
| 2016/0228126 | A1 * | 8/2016 | Squire .............. A61B 17/12109 |

FOREIGN PATENT DOCUMENTS

| CN | 104910882 A | 9/2015 |
| CN | 110734754 A | 1/2020 |

* cited by examiner

*Primary Examiner* — John J Figueroa
(74) *Attorney, Agent, or Firm* — Calfee Halter & Griswold LLP

(57) ABSTRACT

A mussel bionic gel composition includes: a mussel bionic copolymer and/or a mussel bionic compound, a cross-linking agent and water, wherein the mussel bionic copolymer includes a structural unit A from a vinyl monomer and a structural unit B from a vinyl-containing mussel bionic catechol group monomer; and the mussel bionic compound includes polyacrylamide and a mussel bionic catechol compound. The self-growth gel particle profile control and water plugging agent prepared from the composition is low in initial apparent viscosity, easy to inject and far in migration, has good shear repairing performance and is particularly applicable to a low-permeability fractured reservoir, thereby adjusting a micro-fracture network, improving a fracture channel and increasing waterflood efficiency and recovery efficiency.

20 Claims, 3 Drawing Sheets

MUSSEL BIONIC GEL COMPOSITION, SELF-REPAIRING GEL, PROFILE CONTROL AND WATER PLUGGING AGENT, METHOD FOR PREPARING SELF-REPAIRING GEL, AND USE

PRIORITY CLAIM & CROSS REFERENCE

The application claims priority to Chinese Application No. 202011290186.0, filed on Nov. 17, 2020, entitled "mussel bionic gel composition, self-repairing gel, profile control and water plugging agent, method for preparing self-repairing gel, and use", which is herein specifically and entirely incorporated by reference.

FIELD

The present disclosure relates to the field of profile control and water plugging agents for a low-permeability fractured reservoir, in particular to a mussel bionic gel composition, a method for the preparation of a self-repairing gel from the mussel bionic gel composition, a self-repairing gel prepared through the method, a method for the preparation of a self-growth gel particle profile control and water plugging agent from the self-repairing gel, a self-growth gel particle profile control and water plugging agent prepared through the method, and use of the self-growth gel particle profile control and water plugging agent to a low-permeability fractured reservoir.

BACKGROUND

Natural fractures of a low-permeability/ultralow-permeability reservoir develop relatively, artificial fractures increase non-uniformity of a matrix-fractured reservoir stratum, and channeling along the fractures quite easily occurs on injected fluid. Consequently, injected water, a chemical agent or the like does not effectively act on a target stratum to realize effective sweep and displacement. A conventional gel type profile control and water plugging agent is easily affected by multiple shearing, formation water dilution, rock adsorption or the like in injection and migration processes. A requirement for production conditions and equipment of polymerization of polymer microspheres is relatively strict, and an adaptability to a stratum is relatively poor. A pre-cross-linked volume expansion particle has a relatively high expandability, and it is quite easy for the particle to plug up a small fracture channel of a low-permeability reservoir stratum. For a low-permeability fractured reservoir, a conventional profile control and water plugging agent still has problems such as a relatively high initial viscosity, relatively poor injection performance and a difficult migration capacity in fractures.

CN104910882A discloses a flexible gel particle and a flexible gel particle profile control and water plugging agent prepared therefrom. The flexible gel particle is formed, through polymerization, by acrylamide, a temperature-resistant monomer and an alkali-resistant and salt-resistant monomer. The flexible gel particle profile control and water plugging agent prepared therefrom is environmentally friendly, low in cost and simple in preparation process, but the flexible gel particle is relatively larger in particle size, within a millimeter-level range (1 mm to 5 mm) and is not applicable to being injected and migrated in a low-permeability fractured reservoir. In addition, the flexible gel particle is relatively high in strength, and it is easy for the particle to plug up a small fracture channel.

CN110734754A discloses a drilling fluid plugging agent composition, a plugging agent, a preparation method for the plugging agent, and use. The plugging agent composition includes a bionic mussel adhesive, nanometer clay, a vinyl monomer, a cross-linking agent and water. A plugging agent while drilling prepared from the plugging agent composition has a relatively strong capacity of resisting a high temperature of 180° C., may effectively plug up a sand tray leakage layer with a maximum pore radius of 50 mD to 100 mD, bears a pressure of 4 MPa or above, is applicable to requirements of drilling fluid, and does not relate to the field of oil field development.

SUMMARY

Objectives of the present disclosure are to provide a mussel bionic gel composition, a self-repairing gel, a self-growth gel particle profile control and water plugging agent, a preparation method for a self-repairing gel, and use, to solve the problems, such as a high initial apparent viscosity, poor injection performance and a difficult migration capacity in fractures, of a profile control and water plugging agent when being applied to a low-permeability fractured reservoir in the prior art.

To implement the foregoing objectives, a first aspect of the present disclosure provides a mussel bionic gel composition for preparing a self-repairing gel, including: a mussel bionic copolymer and/or a mussel bionic compound, a cross-linking agent and water, wherein the mussel bionic copolymer includes a structural unit A from a vinyl monomer and a structural unit B from a vinyl-containing mussel bionic catechol group monomer; and the mussel bionic compound includes polyacrylamide and a mussel bionic catechol compound.

A second aspect of the present disclosure provides a self-repairing gel, wherein the gel is formed, through aging and gelatinizing, by the composition including the mussel bionic copolymer and/or the mussel bionic compound, the cross-linking agent and the water;

wherein the mussel bionic copolymer includes a structural unit A from a vinyl monomer and a structural unit B from a vinyl-containing mussel bionic catechol group monomer; and the mussel bionic compound includes polyacrylamide and a mussel bionic catechol compound.

A third aspect of the present disclosure provides a method for preparing a self-repairing gel, including the following steps:

(1a) in the presence of an initiator and a chain transfer agent, performing a copolymerization reaction with a vinyl monomer and a vinyl-containing mussel bionic catechol group monomer to obtain a mussel bionic copolymer; and/or (1b) mixing an aqueous solution of a mussel bionic catechol compound and an aqueous solution of polyacrylamide to obtain a mussel bionic compound; and (2) performing aging and gelatinizing on the mussel bionic copolymer and/or the mussel bionic compound and a cross-linking agent to obtain the self-repairing gel.

A fourth aspect of the present disclosure provides a self-repairing gel prepared through the foregoing method.

A fifth aspect of the present disclosure provides a self-growth gel particle profile control and water plugging agent, wherein the profile control and water plugging agent is formed, through blending and shearing, by the foregoing self-repairing gel and water.

A sixth aspect of the present disclosure provides a use of the foregoing self-growth gel particle profile control and water plugging agent to a low-permeability fractured reservoir.

Through the foregoing technical solutions, the present disclosure has the following advantages:

(1) The self-growth gel particle profile control and water plugging agent of the present disclosure is low in initial apparent viscosity (3 mPa·s to 15 mPa·s), easy to inject and far in migration, it is not easy for the agent to plug up a stratum near a well, the agent is not affected by shearing in injection and migration processes, the agent has good shear repairing performance, and a blocky gel may implement self-repairing after being broken.

(2) The self-growth gel particle profile control and water plugging agent of the present disclosure has a particle size of 200 nm to 5000 nm, and under a formation temperature (less than or equal to 110° C.) and a water salinity (less than or equal to 150000 mg/L), particles may implement aggregation and self-growth, thereby increasing strength of the profile control and water plugging agent.

(3) The self-growth gel particle profile control and water plugging agent of the present disclosure may disperse evenly and stably at room temperature, thereby facilitating short-term preservation and transportation.

(4) The self-growth gel particle profile control and water plugging agent of the present disclosure is applicable to a low-permeability fractured reservoir, thereby providing a solution for fracture channeling and adjusting a microfracture network.

DETAILED DESCRIPTION

Figure 1:
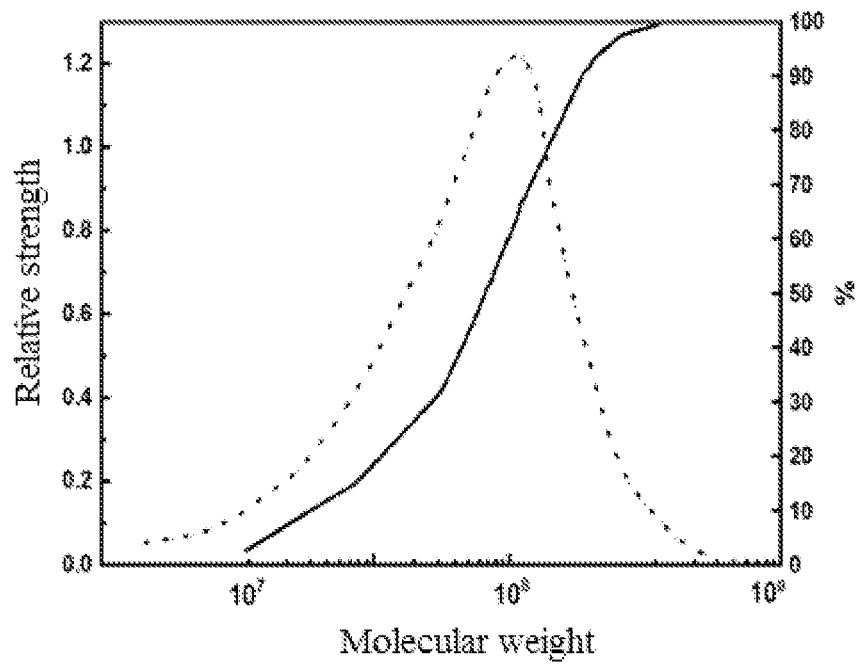
FIG. 1 is a gel chromatograph illustrating a molecular weight test of a mussel bionic copolymer according to Example 1 of the present disclosure.

End points of ranges and any value disclosed herein are not limited to the precise ranges or values. These ranges or values should be understood as including values that approach these ranges or values. For numerical ranges, combinations can be implemented between end point values of each range, between end point values of each range and single point values and between single point values to obtain one or more new numerical ranges, and these numerical ranges should be considered to be specifically disclosed herein.

A first aspect of the present disclosure provides a mussel bionic gel composition for preparing a self-repairing gel, including: a mussel bionic copolymer and/or a mussel bionic compound, a cross-linking agent and water.

Although it is mentioned in an existing patent document (CN110734754A) that introducing, into a plugging agent composition, a mussel imitating adhesive rich in catechol functional group can enhance an adhesion property of a plugging agent and improve compressive strength, the inventor of the present disclosure finds that, introducing a catechol structure into a profile control and water plugging agent gel particle to interact with a cross-linking agent structure used to prepare a gel can make covalent chemical action and non-covalent action (such as a hydrogen bond, a cation –π, π-π and dewatering etc.) occur between a gel and gel particles, thereby implementing a self-repairing function of the gel and a self-growth function of the gel particle. Considering the environment (such as formation temperature and water salinity irons) that is faced by the profile control and water plugging agent in a low-permeability fractured reservoir, under available conditions, in some specific embodiments of the present disclosure, a catechol structure included in the mussel bionic polymer and/or the mussel bionic compound combines with and interacts with a cross-linking agent structure used to prepare a gel. Therefore, on one hand, a gel has a self-repairing capacity after being broken, and gel particles have an environmental-response self-growth capacity in a formation temperature, water salinity and under-water environment. On the other hand, the gel has an adhesive action on a rock wall surface, and enhances retention stability of a profile control and water plugging agent particle.

In some specific embodiments of the present disclosure, the mussel bionic copolymer includes a structural unit A from a vinyl monomer and a structural unit B from a vinyl-containing mussel bionic catechol group monomer.

In some specific embodiments of the present disclosure, to facilitate dissolution of a polymer in water, shorten the time that is required for dissolution to prepare a polymer, meet a requirement on a relatively low initial viscosity and improve long-term stability of a polymer structure that ages in a stratum environment, preferably, the mussel bionic copolymer has a degree of hydrolysis of 5 mol % to 28 mol %, more preferably 10 mol % to 18 mol %, and a complete dissolution time shorter than 1.5 h. The aggregation morphology of a polymer with a degree of hydrolysis structure in water is conducive to a cross-linking reaction with a cross-linking agent and enhancing a viscoelastic property of a gel.

In some specific embodiments of the present disclosure, to improve strength of a gel and gel particles under temperature and water salinity and to make the gel and the gel particle possess relatively high toughness, preferably, the mussel bionic copolymer has a weight-average molecular weight of 7 million g/mol to 10 million g/mol, more preferably 8 million g/mol to 9 million g/mol.

In some specific embodiments of the present disclosure, the mussel bionic compound includes polyacrylamide and a mussel bionic catechol compound.

In some specific embodiments of the present disclosure, to facilitate dissolution of a polymer in water, shorten the time that is required for dissolution to prepare a polymer, meet a requirement on a relatively low initial viscosity and improve long-term stability of a polymer structure that ages in a stratum environment, preferably, polyacrylamide has a degree of hydrolysis of 5 mol % to 28 mol %, more preferably 5 mol % to 17 mol %, and a complete dissolution time shorter than 1.5 h. The aggregation morphology of a polymer with a degree of hydrolysis structure is conducive to a cross-linking reaction with a cross-linking agent and enhancing a viscoelastic property of a gel.

In some specific embodiments of the present disclosure, to improve strength of a gel and gel particles under temperature and water salinity and to make the gel and the gel particle possess relatively high toughness, preferably, polyacrylamide has a weight-average molecular weight of 7 million g/mol to 15 million g/mol, more preferably 8 million g/mol to 12 million g/mol.

In some specific embodiments of the present disclosure, polyacrylamide can be obtained commercially, for example, polyacrylamide can be purchased from Shanghai Macklin Biochemical Co., Ltd, and polyacrylamide can also be prepared through various methods known to those skilled in the art. The preparation method can be known to those skilled in the art and will no longer be described unnecessarily here.

In some specific embodiments of the present disclosure, to improve an adhesion property of a gel and reduce cost, preferably, a consumption amount of the mussel bionic copolymer is 0.2 part by weight to 0.6 part by weight, a consumption amount of the mussel bionic compound is 0.2 part by weight to 0.6 part by weight, a consumption amount of the cross-linking agent is 0.6 part by weight to 1.5 parts by weight, and a consumption amount of the water is 97.9 parts by weight to 99.2 parts by weight.

In some specific embodiments of the present disclosure, more preferably, based on a total weight of the composition, a consumption amount of the mussel bionic copolymer is 0.25 part by weight to 0.35 part by weight, a consumption amount of the mussel bionic compound is 0.05 part by weight to 0.15 part by weight, a consumption amount of the cross-linking agent is 0.6 part by weight to 1.2 parts by weight, and a consumption amount of the water is 98.3 parts by weight to 99.1 parts by weight.

In some specific embodiments of the present disclosure, based on a total weight of the mussel bionic copolymer, a content of the structural unit A is 75 wt % to 90 wt %, preferably 85 wt % to 90 wt %, and a content of the structural unit B is 10 wt % to 25 wt %, preferably 10 wt % to 15 wt %.

In some specific embodiments of the present disclosure, based on a total weight of the mussel bionic compound, a content of polyacrylamide is 65 wt % to 85 wt %, preferably 75 wt % to 80 wt %; and a content of the mussel bionic catechol compound is 15 wt % to 35 wt %, preferably 20 wt % to 25 wt %.

In some specific embodiments of the present disclosure, the vinyl-containing mussel bionic catechol group monomer is selected from one or more of compounds with a structure as shown in a formula (1).

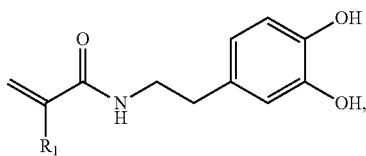

Formula (1)

wherein $R_1$ is —H or —CH$_3$ (i.e., N-(3,4-dihydroxyphenethyl)acrylamide and/or N-(3,4-dihydroxyphenethyl)methacrylamide).

In some specific embodiments of the present disclosure, the mussel bionic catechol compound may be a mussel bionic catechol compound that is natural or artificially synthesized in the art, and for example, may be one or more of polyphenols such as dopamine, tannin acid, catechin, ellagic acid and gallic acid.

In some specific embodiments of the present disclosure, preferably, the mussel bionic catechol compound is selected from one or more of compounds with a structure as shown in a formula (2).

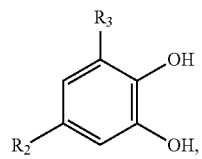

Formula (2)

wherein $R_2$ is any one of —COOH, —OH, —C$_n$H$_{2n}$NH$_2$, —(CHO)$_x$— and —C$_n$H$_{2n+1}$, more preferably, x is an integer of 1 to 6, and/or n is an integer of 1 to 12.

In some specific embodiments of the present disclosure, preferably, the mussel bionic catechol compound is selected from one or more of compounds with a structure as shown in a formula (2).

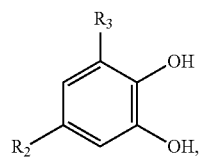

Formula (2)

where $R_3$ is —H or —OH.

In some specific embodiments of the present disclosure, preferably, the mussel bionic catechol compound is selected from dopamine and/or tannin acid.

In some specific embodiments of the present disclosure, the vinyl monomer may be selected from one or more of acrylic acid, methacrylic acid, ethylacrylic acid, propylacrylic acid, butylacrylic acid, amylacrylic acid and hexylacrylic acid, preferably acrylic acid; and the vinyl monomer may also be selected from one or more of acrylamide, methacrylamide, ethylacrylamide, propylacrylamide, butylacrylamide, amylacrylamide and hexylacrylamide, preferably acrylamide.

In some specific embodiments of the present disclosure, the cross-linking agent is selected from one or more of water-soluble phenolic resin, polyethyleneimine and polypropyleneimine, and preferably, the cross-linking agent is selected from the water-soluble phenolic resin and/or polyethyleneimine.

In some specific embodiments of the present disclosure, to improve strength of a cross-linked network in a gel, avoid problems of dewatering or brittleness at high temperature and meanwhile enhance a growth action of gel particles in a formation water environment, preferably, the water-soluble phenolic resin has a weight-average molecular weight of 5000 g/mol to 30000 g/mol; and preferably, polyethyleneimine has a weight-average molecular weight of 1500 g/mol to 10000 g/mol.

In some specific embodiments of the present disclosure, the water-soluble phenolic resin, polyethyleneimine and polypropyleneimine can be obtained commercially, for example, the water-soluble phenolic resin can be purchased from Shengli Oilfield Service Co., Ltd, and polyethyleneimine and polypropyleneimine can be purchased from Shanghai Macklin Biochemical Co., Ltd; and the water-soluble phenolic resin, polyethyleneimine and polypropyleneimine can also be prepared through various methods known to those skilled in the art. The preparation method can be known to those skilled in the art and will no longer be described unnecessarily here.

The inventor of the present disclosure finds that, preferably, in the mussel bionic gel composition, when the mussel bionic copolymer has a degree of hydrolysis of 10 mol % to 18 mol %, a weight-average molecular weight of 8 million g/mol to 9 million g/mol, and a complete dissolution time shorter than 1.5 h; in the mussel bionic compound, based on a total weight of the mussel bionic compound, a content of polyacrylamide is 75 wt % to 80 wt %, and a content of the mussel bionic catechol compound is 20 wt % to 25 wt %, wherein polyacrylamide has a degree of hydrolysis of 5 mol % to 17 mol %, a weight-average molecular weight of 8 million g/mol to 12 million g/mol, and a complete dissolution time shorter than 1.5 h; the cross-linking agent is selected from water-soluble phenolic resin and/or polyethyleneimine, wherein the water-soluble phenolic resin has a weight-average molecular weight of 5000 g/mol to 30000 g/mol, and polyethyleneimine has a weight-average molecular weight of 1500 g/mol to 10000 g/mol; and a consumption amount of the mussel bionic copolymer is 0.25 part by weight to 0.4 part by weight, a consumption amount of the mussel bionic compound is 0.25 part by weight to 0.4 part by weight, a consumption amount of the cross-linking agent is 0.8 part by weight to 1.2 parts by weight, and a consumption amount of the water is 98.4 parts by weight to 98.95 parts by weight, the guarant viscosity of the profile control and water plugging agent that ages under a simulated formation temperature and water salinity can be especially improved, and an aggregation and self-growth effect of gel particles in the profile control and water plugging agent can be enhanced, which is quite conducive to improving the injection performance, shear repairing performance and migration capacity in fractures of the profile control and water plugging agent.

A second aspect of the present disclosure provides a self-repairing gel, wherein the gel is formed, through aging and gelatinizing, by the composition including the mussel bionic copolymer and/or the mussel bionic compound, the cross-linking agent and the water; wherein the mussel bionic copolymer includes a structural unit A from a vinyl monomer and a structural unit B from a vinyl-containing mussel bionic catechol group monomer; and the mussel bionic compound includes polyacrylamide and a mussel bionic catechol compound. Types and consumption amounts of all components in the composition may be reasonably selected according to the above and will not be described unnecessarily here.

In some specific embodiments of the present disclosure, preferably, the gel has a rheological elasticity modulus of 3 Pa to 15 Pa, and a viscous modulus of 1 Pa to 3 Pa.

In some specific embodiments of the present disclosure, preferably, conditions of the aging and gelatinizing include: a temperature of 60° C. to 90° C., and a time of 24 h to 72 h.

A third aspect of the present disclosure provides a method for preparing a self-repairing gel, including the following steps:

(1a) in the presence of an initiator and a chain transfer agent, performing a copolymerization reaction with a vinyl monomer and a vinyl-containing mussel bionic catechol group monomer to obtain a mussel bionic copolymer; and/or (1b) mixing an aqueous solution of a mussel bionic catechol compound and an aqueous solution of polyacrylamide to obtain a mussel bionic compound; and (2) performing aging and gelatinizing on the mussel bionic copolymer and/or the mussel bionic compound and a cross-linking agent to obtain the self-repairing gel.

In some specific embodiments of the present disclosure, the vinyl monomer and the vinyl-containing mussel bionic catechol group monomer may be selected according to the above and will no longer be described unnecessarily here.

In some specific embodiments of the present disclosure, the mussel bionic catechol compound and polyacrylamide may be selected according to the above and will no longer be described unnecessarily here.

In some specific embodiments of the present disclosure, the cross-linking agent may be selected according to the above and will no longer be described unnecessarily here.

In some specific embodiments of the present disclosure, the initiator may be an azo initiator. The azo initiator, for example, may be selected from one or more of dimethyl 2,2'-azobis(2-methylpropionate), 2,2'-azobis[2-methylpropionamidine]dihydrochloride, azodicarbonamide, 1,2-bis(2-(4,5-dihydro-1H-imidazol-2-yl)propan-2-yl)diazene dihydrochloride, 1-((cyano-1-methylethyl)azo)formamide, 1,1'-azobis(cyclohexane-1-carbonitrile), 4,4'-azobis(4-cyanovaleric acid), 2,2''-azobis-(N,N''-dimethyleneisobutyramidine), 2,2'-azobis(2-methylpropionitrile), 2,2'-azodi(2-methylbutyronitrile) and 2,2'-azobisisoheptonitrile, and preferably, the initiator is selected from 2,2'-azobis[2-methylpropionamidine]dihydrochloride and/or 1,2-bis(2-(4, 5-dihydro-1H-imidazol-2-yl)propan-2-yl)diazene dihydrochloride.

In some specific embodiments of the present disclosure, the chain transfer agent is selected from one or more of water-soluble dithiocarbonate, water-soluble xanthate and water-soluble trithiocarbonate, preferably water-soluble xanthate and/or water-soluble trithiocarbonate.

In some specific embodiments of the present disclosure, in the step (1a), a weight ratio of the vinyl monomer to the vinyl-containing mussel bionic catechol group monomer to the initiator to the chain transfer agent is (61-76):(7-12):(0.08-0.15):(0.2-0.5).

In some specific embodiments of the present disclosure, preferably, the mussel bionic copolymer has a degree of hydrolysis of 5 mol % to 28 mol %, more preferably 10 mol % to 18 mol %; a weight-average molecular weight of 7 million g/mol to 10 million g/mol, more preferably 8 million g/mol to 9 million g/mol; and a complete dissolution time shorter than 1.5 h.

In some specific embodiments of the present disclosure, in the step (1a), the copolymerization reaction is usually performed under an inert atmosphere, and the inert atmosphere, for example, may be one or more of nitrogen gas, helium gas, neon gas and argon gas.

In some specific embodiments of the present disclosure, preferably, the copolymerization reaction is carried out at 55° C. to 70° C. for 4 h to 8 h.

In some specific embodiments of the present disclosure, in the step (1b), a weight ratio of the mussel bionic catechol compound to polyacrylamide is (5-10):(25-30).

In some specific embodiments of the present disclosure, preferably, polyacrylamide has a degree of hydrolysis of 5 mol % to 28 mol %, more preferably 5 mol % to 17 mol %; a weight-average molecular weight of 7 million g/mol to 15 million g/mol, more preferably 8 million g/mol to 12 million g/mol; and a complete dissolution time shorter than 1.5 h.

In some specific embodiments of the present disclosure, to make a compounding system of two compounds more stable and make a cross-linking reaction speed controllable, preferably, oxidation modification at 10 mol % to 40 mol % is further performed on the mussel bionic catechol compound before compounding. The oxidation modification specifically includes: adjusting, by using a pH regulator, a pH value (approximately 5-6) of the mussel bionic catechol compound to be slightly alkaline (approximately 8-9), wherein the pH regulator may be one or more of NaOH, $Na_2CO_3$, $NaHCO_3$, ethanolamine, polyetheramine, polyimine and polyamide, and preferably, a number-average molecular weight of polyetheramine, polyimine and polyamide is less than 5000 g/mol.

In some specific embodiments of the present disclosure, in the step (2), a weight ratio of the mussel bionic copolymer and/or the mussel bionic compound to the cross-linking agent is (0.2-0.5):(6-1.2).

In some specific embodiments of the present disclosure, preferably, in the step (2), the gelatinizing is carried out at 60° C. to 90° C. for 24 h to 72 h.

A fourth aspect of the present disclosure provides a self-repairing gel prepared through the foregoing method.

In some specific embodiments of the present disclosure, preferably, the self-repairing gel has a rheological elasticity modulus of 3 Pa to 15 Pa, and a viscous modulus of 1 Pa to 3 Pa. The self-repairing gel is formed through chemical cross-linking and non-covalent action cross-linking, has an adhesion property on a rock wall surface, and itself has cohesiveness and self-repairability.

A fifth aspect of the present disclosure provides a self-growth gel particle profile control and water plugging agent, wherein the profile control and water plugging agent is formed, through blending and shearing, by the self-repairing gel and water.

In some specific embodiments of the present disclosure, preferably, a weight ratio of the self-repairing gel to the water is (1-2):(0.5-6).

In some specific embodiments of the present disclosure, the water that is blended with the self-repairing gel may be pure water, tap water and water that has a formation water salinity (less than or equal to 150000 mg/L).

In some specific embodiments of the present disclosure, the blending and shearing may be performed through conventional methods in the art as long as the profile control and water plugging agent reaches a required particle size. For example, mechanical shearing may be performed on a blend of the self-repairing gel and the water by using a homogenizer, a stamp mill and a mechanical mill.

In some specific embodiments of the present disclosure, preferably, the profile control and water plugging agent has an initial particle size of 200 nm to 5000 nm, and an apparent viscosity of 3 mPa·s to 15 mPa·s.

A sixth aspect of the present disclosure provides a use of the self-growth gel particle profile control and water plugging agent to a low-permeability fractured reservoir.

The self-growth gel particle profile control and water plugging agent of the present disclosure may disperse stably at room temperature and is low in initial apparent viscosity (3 mPa·s to 15 mPa·s), easy to inject and far in migration, it is not easy for the agent to plug up a stratum near a well, and the agent is not affected by shearing in injection and migration processes. In an environment with a formation water salinity (less than or equal to 150000 mg/L) and a formation temperature (less than or equal to 110° C.), a blocky gel in the profile control and water plugging agent may implement self-repairing after being broken, gel particles are cross-linked again to implement aggregation, repairing and self-growth and be gradually adsorbed to a rock surface, and accordingly a particle size of the gel particles increases and strength of the gel particles increases. The gel has good shear repairing performance and is particularly applicable to a low-permeability fractured reservoir, thereby adjusting a micro-fracture network, improving a fracture channel and increasing waterflood efficiency and recovery efficiency.

The present disclosure will be described in detail below through the examples, but it should be understood that the protection scope of the present disclosure is not limited by the examples.

In the following examples and comparative examples, unless otherwise specified, raw materials and reagents that are used are all commercially available products, wherein polyacrylamide (degree of hydrolysis: 5 mol %, and weight-average molecular weight: 12 million g/mol; degree of hydrolysis: 17 mol %, and weight-average molecular weight: 12 million g/mol; degree of hydrolysis: 25 mol %, and weight-average molecular weight: 10 million g/mol; degree of hydrolysis: 36 mol %, and weight-average molecular weight: 5 million g/mol) is purchased from Shanghai Macklin Biochemical Co., Ltd;

polyethyleneimine (weight-average molecular weight: 1500 g/mol) is purchased from Shanghai Macklin Biochemical Co., Ltd;

water-soluble phenolic resin (weight-average molecular weight: 26000 g/mol) is purchased from Shengli Oilfield Service Co., Ltd; and trithiocarbonate is homemade in a laboratory, and a specific preparation method includes the following steps:

adding potassium ethyl xanthogenate and methyl 2-bromopropionate into a flask according to a molar ratio of 1.2:1, with methanol as a solvent, reacting at 25° C. for 18 h, performing rotary evaporation to remove the solvent, and then extracting via ethyl acetate and drying to obtain trithiocarbonate.

Measurement methods involved in the Examples and the comparative examples are as below:

(1) Degree of Hydrolysis Measurement

In accordance with Technical Criterions of Polymer for Oil Displacement of PRC Petroleum and Natural Gas Industry Standards SY/T 5862-2008, a degree of hydrolysis of a polymer was measured.

(2) Molecular Weight Measurement

A US Waters 2695 GPC gel permeation chromatograph was adopted, a column temperature was set to be 25° C. and a mobile phase was $NaNO_3$, and a pretreatment process was as follows: ultrasonically degassing a prepared filtering membrane, weighing 0.03-0.05 g of a polymer sample to be dissolved in 100 mL of the mobile phase, taking 100 μL of sample to be filtered and placed onto a machine, and performing data treatment by a GPC/SEC calibration method to obtain a molecular weight and distribution thereof.

(3) Particle Size Distribution Measurement

A Malvern Zetasizer Nano laser particle size analyzer was adopted and preheated for 20-30 min after being started. A cycle sample injector was switched on. Centering correction was performed on the laser particle size analyzer. Then, a temperature was set to be 25° C., and a sample was prepared. The sample was prepared into a 2-10% dispersion liquid. To a vessel of the analyzer, 15-20 mL of the dispersion liquid was added for measurement. Analysis was performed through Zetasizer nano software of the analyzer to obtain a particle size distribution diagram.

(4) Rheological Viscoelastic Modulus Measurement and Rheological Self-Repairability Measurement A linear viscoelastic region was determined first through a HaaKe RS60 rheological measurement method. Then, viscoelastic property measurement was performed continuously for 300 s. A storage modulus (G') and a loss modulus (G") were recorded. A self-repairing gel was placed onto a rheometer plate. A temperature was set at 25° C. Scanning was performed first to determine a linear viscoelastic region. A strain value was gradually increased until the gel was broken. The foregoing steps were repeated after staying for 3 min to 10 min later to initially determine self-recovery performance of the gel. Then, strain oscillation self-repairing measurement was performed to determine a temperature and an angular frequency. Cyclic oscillation scanning was performed for 3 times by using strain values before and after a breaking point.

(5) Viscosity Measurement

A brookfield-DV2D viscometer was adopted, a temperature was set to be 25° C. and a shear rate to be 6 rpm, and a water solution of gel particles was evenly poured into a cylindrical measurement vessel to be subjected to direct measurement to obtain an apparent viscosity.

Example 1

(1) Preparation of Mussel Bionic Copolymer

At room temperature, 6.3 g of acrylamide and 0.6 g of acrylic acid were added to 25 g of deionized water first. After introducing nitrogen gas and stirring for 25 min, 0.8 g of a monomer of N-(3,4-dihydroxyphenethyl)acrylamide was added. After uniform dissolving, 0.008 g of 2,2'-azobis[2-methylpropionamidine]dihydrochloride and 0.02 g of water-soluble xanthate were added. After a water bath reaction at 65° C. for 6 h, washing with ethanol was performed. Drying was performed in an oven at 40° C. After crushing and granulating, a white or off-white mussel bionic copolymer was obtained.

The mussel bionic copolymer has a degree of hydrolysis of 10 mol %. Gel permeation chromatography was performed on the mussel bionic copolymer, and results are shown in FIG. 1. From FIG. 1, it can be known that, the mussel bionic copolymer has a weight-average molecular weight of 8 million g/mol.

(2) Preparation of Self-Repairing Gel

To 98.6 parts by weight of deionized water, 0.4 part by weight of the mussel bionic copolymer prepared in the step (1) was added, to prepare a solution. Then, 1 part by weight of water-soluble phenolic resin was added. After uniform stirring, sealing in an oven at 80° C. and aging for 60 h were performed, to obtain the self-repairing gel.

Figure 2:
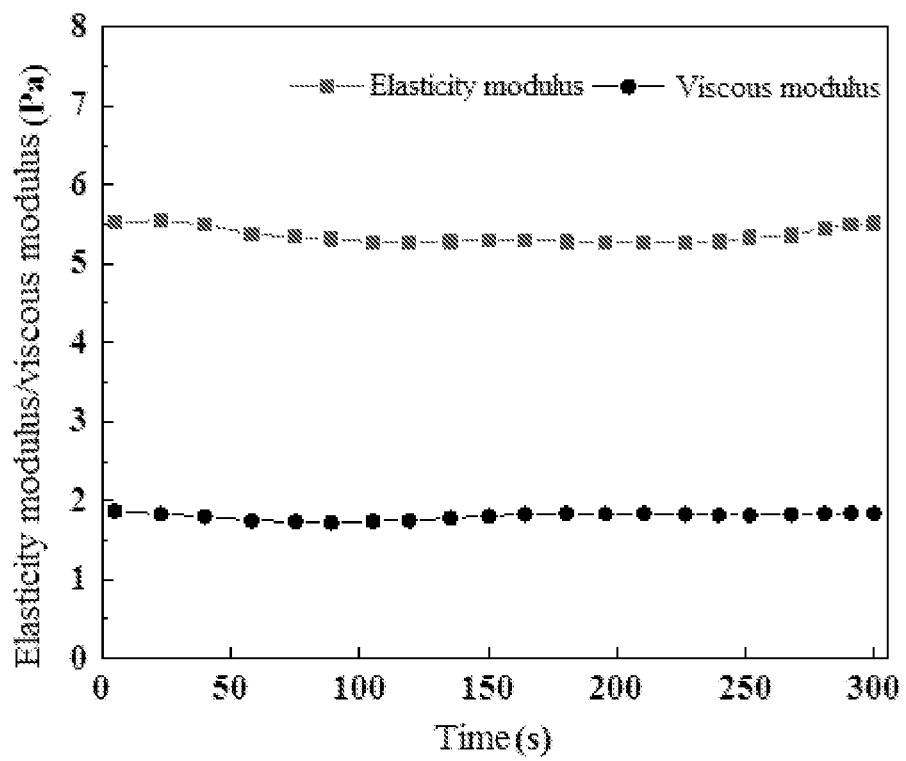
FIG. 2 is a curve graph illustrating a relationship between modulus and time of a self-repairing gel according to Example 1 of the present disclosure.

Rheological viscoelastic modulus measurement was performed on the self-repairing gel, and results are shown in FIG. 2. From FIG. 2, it can be seen that, the self-repairing gel has a rheological elasticity modulus of 5.5 Pa to 5.6 Pa and a viscous modulus of 1.8 Pa to 1.9 Pa.

Figure 3:
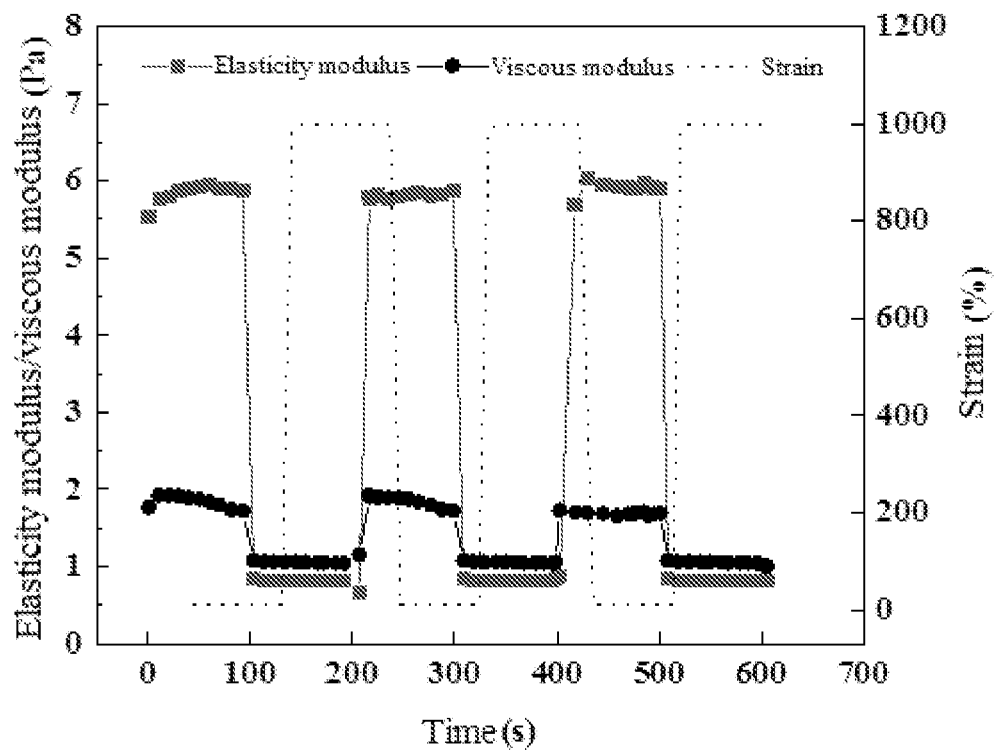
FIG. 3 is a curve graph illustrating oscillation strain scanning of a self-repairing gel according to Example 1 of the present disclosure.

Rheological self-repairability measurement was performed on the self-repairing gel, and results are shown in FIG. 3. From FIG. 3, it can be known that, in rheological self-repairability measurement, an oscillation strain of the self-repairing gel is 10% to 1000% and modulus repairing may be implemented in both cycles. This indicates that the self-repairing gel prepared in Example 1 has good self-repairability.

Figure 4:
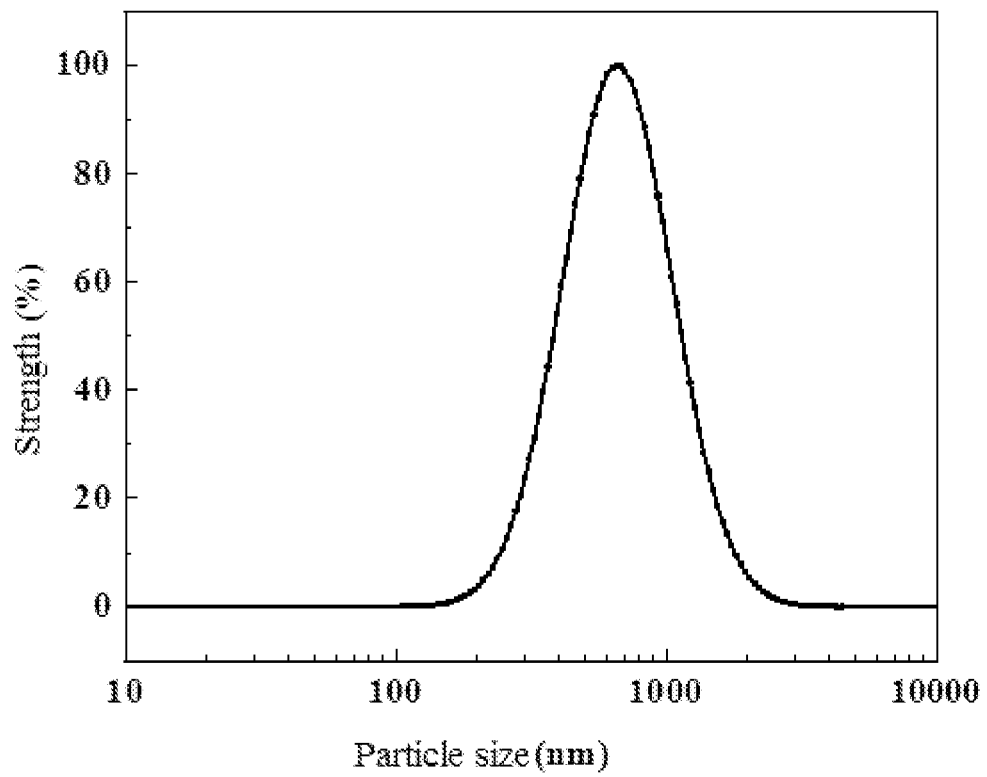
FIG. 4 is a diagram illustrating particle size distribution of a self-growth gel particle profile control and water plugging agent according to Example 1 of the present disclosure.

(3) Preparation of Self-Growth Gel Particle Profile Control and Water Plugging Agent At room temperature, the self-repairing gel in the step (2) and tap water (water salinity: 400 mg/L to 500 mg/L) were added to a mechanical stamp mill according to a weight ratio of 1:1. At a revolution speed of 8500 rpm, constant-speed shearing was performed for 12 min, to obtain the self-growth gel particle profile control and water plugging agent. Particle size distribution measurement was performed on the self-growth gel particle profile control and water plugging agent, and results are shown in FIG. 4. From FIG. 4, it can be seen that, the profile control and water plugging agent has a particle size distribution in the form of single peaks, a relatively mean median value of approximately 650 nm, and an initial particle size of 200 nm to 2000 nm. Viscosity measurement was performed on the self-growth gel particle profile control and water plugging agent, so that it is obtained that the profile control and water plugging agent has an initial apparent viscosity of 11.2 mPa·s.

Example 2

(1) Preparation of Mussel Bionic Compound

At room temperature, 0.2 g of tannin acid was added to 15 g of deionized water first. After stirring and dissolving, 1 mL of 10 wt % polyether amine was dropwise added to adjust a pH value of a solution to 8.6, to obtain a solution A1. Polyacrylamide was prepared into 250 mL of a 0.4 wt % solution B1. The solution A1 and the solution B1 were mixed to obtain the mussel bionic compound.

Wherein, polyacrylamide has a degree of hydrolysis of 5 mol %, and a weight-average molecular weight of 12 million g/mol.

(2) Preparation of Self-Repairing Gel

To the mussel bionic compound in the step (1), 0.7 part by weight of polyethyleneimine was added. After uniform stirring, sealing in an oven at 90° C. and aging for 36 h were performed, to obtain the self-repairing gel.

Rheological viscoelastic modulus measurement was performed on the self-repairing gel, so that it is obtained that the self-repairing gel has a rheological elasticity modulus of 3.6 Pa to 3.8 Pa and a viscous modulus of 1.3 Pa to 1.4 Pa.

Figure 5:
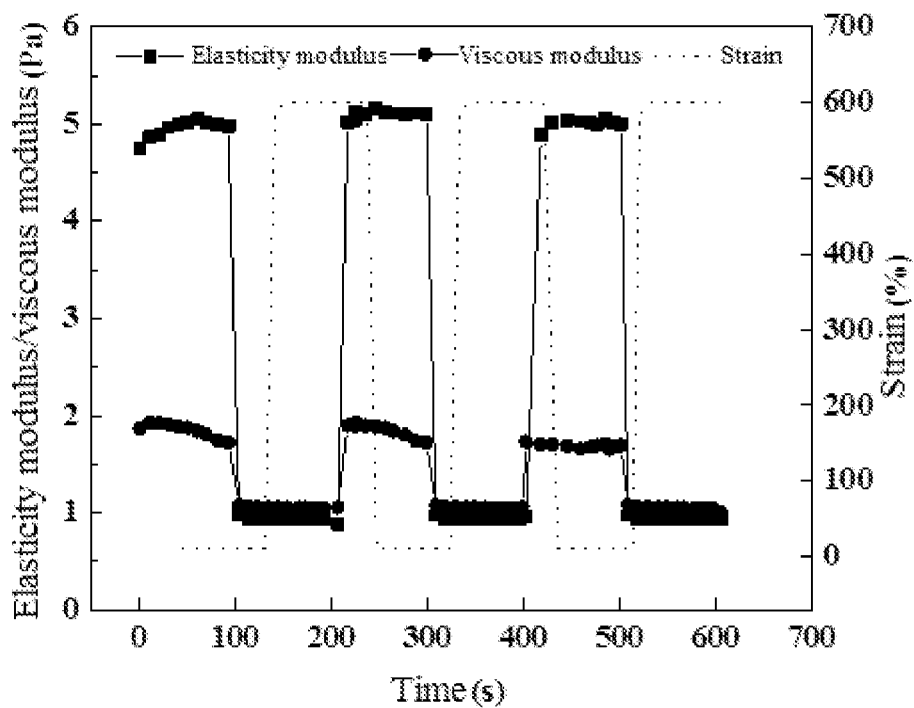
FIG. 5 is a curve graph illustrating oscillation strain scanning of a self-repairing gel according to Example 2 of the present disclosure.

Rheological self-repairability measurement was performed on the self-repairing gel, and results are shown in FIG. 5. From FIG. 5, it can be seen that, in rheological self-repairability measurement, an oscillation strain of the self-repairing gel is 10% to 1000% and modulus repairing may be implemented in both cycles. This indicates that the self-repairing gel prepared in example 2 has good self-repairability.

Figure 6:
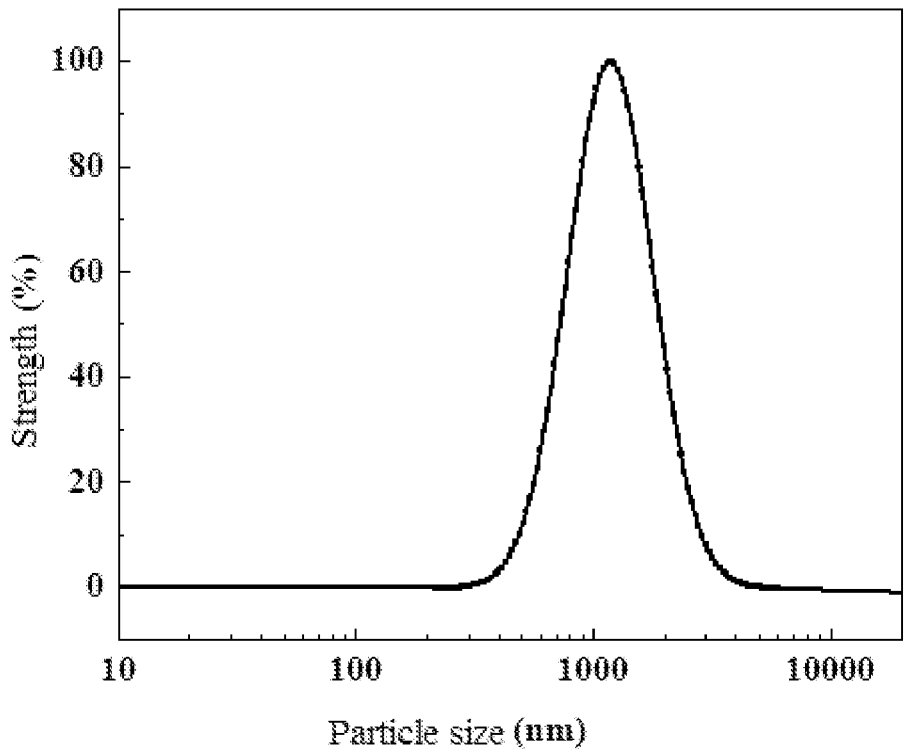
FIG. 6 is a diagram illustrating particle size distribution of a self-growth gel particle profile control and water plugging agent according to Example 2 of the present disclosure.

(3) Preparation of Self-Growth Gel Particle Profile Control and Water Plugging Agent At room temperature, the self-repairing gel in the step (2) and tap water were added to a homogenizer according to a weight ratio of 2:1. At a revolution speed of 12000 rpm, constant-speed shearing was performed for 6 min, to obtain the self-growth gel particle profile control and water plugging agent. Particle size distribution measurement was performed on the self-growth gel particle profile control and water plugging agent, and results are shown in FIG. 6. From FIG. 6, it can be seen that, the profile control and water plugging agent has a particle size distribution in the form of single peaks, a relatively mean median value of approximately 1000 nm, and an initial particle size of 400 nm to 3000 nm. Viscosity measurement was performed on the self-growth gel particle profile control and water plugging agent, so that it is obtained that the profile control and water plugging agent has an initial apparent viscosity of 14.8 mPa·s.

Example 3

Preparation of Mussel Bionic Copolymer

At room temperature, 12 g of acrylamide and 3 g of acrylic acid were added to 60 g of deionized water first. After introducing nitrogen gas and stirring for 20 min, 2.3 g of a monomer of N-(3,4-dihydroxyphenethyl)methacrylamide was added. After uniform dissolving, 0.018 g of 1,2-bis(2-(4,5-dihydro-1H-imidazol-2-yl)propan-2-yl)diazene dihydrochloride and 0.05 g of water-soluble trithiocarbonate were added. After a water bath reaction at 50° C. for 8 h, washing with ethanol was performed. Drying was performed in an oven at 40° C. After crushing and granulating, a white or off-white mussel bionic copolymer was obtained.

The mussel bionic copolymer has a degree of hydrolysis of 18 mol %, and a weight-average molecular weight of 9 million g/mol.

(2) Preparation of Self-Repairing Gel

To 98.9 parts by weight of deionized water, 0.3 part by weight of the mussel bionic copolymer prepared in the step (1) was added, to prepare a solution. Then, 0.8 part by weight of polyethyleneimine was added. After uniform stirring, sealing in an oven at 90° C. and aging for 40 h were performed, to obtain the self-repairing gel.

Rheological viscoelastic modulus measurement was performed on the self-repairing gel, so that it is obtained that the self-repairing gel has a rheological elasticity modulus of 5.6 Pa to 5.8 Pa and a viscous modulus of 1.8 Pa to 1.9 Pa.

Rheological self-repairability measurement was performed on the self-repairing gel, and in rheological self-repairability measurement, the self-repairing gel can implement modulus repairing in both cycles. Likewise, the self-repairing gel prepared in example 3 has good self-repairability.

(3) Preparation of Self-Growth Gel Particle Profile Control and Water Plugging Agent Salinity water (5000 mg/L NaCl; 300 mg/L $CaCl_2$; 200 mg/L $MgCl_2$) was prepared. Then, at room temperature, the self-repairing gel in the step (2) and the prepared salinity water were added to a mechanical stamp mill according to a weight ratio of 2:1. At a revolution speed of 10000 rpm, constant-speed shearing was performed for 15 min, to obtain the self-growth gel particle profile control and water plugging agent. Particle size distribution measurement was performed on the profile control and water plugging agent, so that it is measured that the profile control and water plugging agent has an initial particle size of 600 nm to 2000 nm. Viscosity measurement was performed on the profile control and water plugging agent, so that it is obtained that the profile control and water plugging agent has an initial apparent viscosity of 14.2 mPa·s.

After the profile control and water plugging agent was sealed and aged at different temperatures for 15 days, the viscosity and particle size distribution of the profile control and water plugging agent at different temperatures were measured, and results are shown in Table 1 and Table 2. From Table 1 and Table 2, it can be seen that, the profile control and water plugging agent has a relatively small initial viscosity. At 80° C. to 90° C., a guarant viscosity of the profile control and water plugging agent increases remarkably. Gel particles in the profile control and water plugging agent have remarkable aggregation and growth effects in a simulated formation temperature and water salinity environment.

Example 4

Preparation of Mussel Bionic Compound

At room temperature, 0.3 g of dopamine was added to 15 g of deionized water first. After stirring and dissolving, 1 mL of 10 wt % NaOH was dropwise added to adjust a pH value of a solution to 9, to obtain a solution A2. Polyacrylamide was prepared into 250 mL of a 0.3 wt % solution B2. The solution A2 and the solution B2 were mixed to obtain the mussel bionic compound.

Wherein, polyacrylamide has a degree of hydrolysis of 17 mol %, and a weight-average molecular weight of 12 million g/mol.

(2) Preparation of Self-Repairing Gel

To the mussel bionic compound in the step (1), 1.0 part by weight of water-soluble phenolic resin was added. After uniform stirring, sealing in an oven at 80° C. and aging for 60 h were performed, to obtain the self-repairing gel.

Rheological viscoelastic modulus measurement was performed on the self-repairing gel, so that it is obtained that the self-repairing gel has a rheological elasticity modulus of 9.4 Pa to 9.5 Pa and a viscous modulus of 2.1 Pa to 2.2 Pa.

Rheological self-repairability measurement was performed on the self-repairing gel, and in rheological self-repairability measurement, the self-repairing gel can implement modulus repairing in both cycles. Likewise, the self-repairing gel prepared in example 4 has good self-repairability.

(3) Preparation of Self-Growth Gel Particle Profile Control and Water Plugging Agent Salinity water (120000 mg/L NaCl; 700 mg/L $CaCl_2$; 600 mg/L $MgCl_2$) was prepared. Then, at room temperature, the self-repairing gel in the step (2) and the prepared salinity water were added to a homogenizer according to a weight ratio of 1:2. At a revolution speed of 10000 rpm, constant-speed shearing was performed for 8 min, to obtain the self-growth gel particle profile control and water plugging agent. Particle size distribution measurement was performed on the profile control and water plugging agent, so that it is measured that the profile control and water plugging agent has an initial particle size of 800 nm to 3500 nm. Viscosity measurement was performed on the profile control and water plugging agent, so that it is obtained that the profile control and water plugging agent has an initial apparent viscosity of 5.8 mPa·s.

After the profile control and water plugging agent was sealed and aged at different temperatures for 7 days, the viscosity and particle size distribution of the profile control and water plugging agent at different temperatures were measured, and results are shown in Table 1 and Table 2. From Table 1 and Table 2, it can be seen that, the profile control and water plugging agent has a relatively small initial viscosity. At 80° C. to 90° C., a guarant viscosity of the profile control and water plugging agent varies remarkably. Likewise, gel particles in the profile control and water plugging agent have aggregation and growth behaviors in a simulated formation temperature and water salinity environment.

Example 5

According to the method in example 3, the difference is that a process for the preparation of the mussel bionic copolymer includes the following steps:

at room temperature, 15 g of acrylamide and 4 g of acrylic acid were added to 70 g of deionized water first. After introducing nitrogen gas and stirring for 20 min, 2.8 g of a monomer of N-(3,4-dihydroxyphenethyl)methacrylamide was added. After uniform dissolving, 0.02 g of 1,2-bis(2-(4,5-dihydro-1H-imidazol-2-yl)propan-2-yl)diazene dihydrochloride and 0.08 g of water-soluble trithiocarbonate were added. After a water bath reaction at 50° C. for 8 h, washing with ethanol was performed. Drying was performed in an oven at 40° C. After crushing and granulating, a white or off-white mussel bionic copolymer was obtained.

The mussel bionic copolymer has a degree of hydrolysis of 21 mol %, and a weight-average molecular weight of 7.5 million g/mol.

Viscosity measurement was performed on the self-growth gel particle profile control and water plugging agent prepared in example 5, so that it is obtained that the profile control and water plugging agent has an initial apparent viscosity of 8.5 mPa·s.

Example 6

According to the method in example 3, the difference is that a process for the preparation of the mussel bionic copolymer includes the following steps:

at room temperature, 24 g of acrylamide and 0.8 g of acrylic acid were added to 80 g of deionized water first. After introducing nitrogen gas and stirring for 20 min, 2.6 g of a monomer of N-(3,4-dihydroxyphenethyl)methacrylamide was added. After uniform dissolving, 0.04 g of 1,2-bis(2-(4,5-dihydro-1H-imidazol-2-yl)propan-2-yl)diazene dihydrochloride and 0.09 g of water-soluble trithiocarbonate were added. After a water bath reaction at 50° C. for 6 h, washing with ethanol was performed. Drying was performed in an oven at 40° C. After crushing and granulating, a white or off-white mussel bionic copolymer was obtained.

The mussel bionic copolymer has a degree of hydrolysis of 3 mol %, and a weight-average molecular weight of 5.8 million g/mol.

Viscosity measurement was performed on the self-growth gel particle profile control and water plugging agent prepared in example 6, so that it is obtained that the profile control and water plugging agent has an initial apparent viscosity of 13.6 mPa·s.

Example 7

According to the method in example 4, the difference is that polyacrylamide has a degree of hydrolysis of 25 mol %, and a weight-average molecular weight of 10 million g/mol.

Viscosity measurement was performed on the self-growth gel particle profile control and water plugging agent prepared in example 7, so that it is obtained that the profile control and water plugging agent has an initial apparent viscosity of 8.5 mPa·s.

Example 8

According to the method in example 4, the difference is that polyacrylamide has a degree of hydrolysis of 36 mol %, and a weight-average molecular weight of 5 million g/mol.

Viscosity measurement was performed on the self-growth gel particle profile control and water plugging agent prepared in example 8, so that it is obtained that the profile control and water plugging agent has an initial apparent viscosity of 8.3 mPa·s.

Example 9

According to the method in example 3, the difference is that a consumption amount of the mussel bionic copolymer is 0.2 part by weight.

Viscosity measurement was performed on the self-growth gel particle profile control and water plugging agent prepared in example 9, so that it is obtained that the profile control and water plugging agent has an initial apparent viscosity of 6.7 mPa·s.

Example 10

According to the method in example 3, the difference is that a consumption amount of the mussel bionic copolymer is 0.1 part by weight.

Viscosity measurement was performed on the self-growth gel particle profile control and water plugging agent prepared in example 10, so that it is obtained that the profile control and water plugging agent has an initial apparent viscosity of 3.1 mPa·s.

Example 11

According to the method in example 4, the difference is that a consumption amount of the mussel bionic compound is 0.6 part by weight.

Viscosity measurement was performed on the self-growth gel particle profile control and water plugging agent prepared in example 11, so that it is obtained that the profile control and water plugging agent has an initial apparent viscosity of 6.2 mPa·s.

Example 12

According to the method in example 4, the difference is that a consumption amount of the mussel bionic compound is 0.7 part by weight.

Viscosity measurement was performed on the self-growth gel particle profile control and water plugging agent prepared in example 12, so that it is obtained that the profile control and water plugging agent has an initial apparent viscosity of 7.3 mPa·s.

Example 13

According to the method in example 4, the difference is that a process for the preparation of the mussel bionic compound includes the following steps:

at room temperature, 0.3 g of dopamine was added to 15 g of deionized water first. After stirring and dissolving, a solution A2 was obtained. Polyacrylamide was prepared into 250 mL of a 0.3 wt % solution B2. The solution A2 and the solution B2 were mixed to obtain the mussel bionic compound.

Viscosity measurement was performed on the self-growth gel particle profile control and water plugging agent prepared in example 13, so that it is obtained that the profile control and water plugging agent has an initial apparent viscosity of 6.5 mPa·s.

Comparative Example 1

According to the method in example 1, the difference is that a monomer of N-(3,4-dihydroxyphenethyl)acrylamide was not added in the step (1).

Viscosity measurement was performed on the profile control and water plugging agent prepared in Comparative example 1, so that it is obtained that the profile control and water plugging agent has an initial apparent viscosity of 9.5 mPa·s.

After the self-growth gel particle profile control and water plugging agents prepared in examples 5 to 13 and Comparative example 1 were sealed and aged at different temperatures for 15 days, the viscosity and particle size distribution of the profile control and water plugging agents at different temperatures were measured, and results are shown in Table 1 and Table 2.

TABLE 1

Guarant viscosity (mPa · s) of self-growth gel particle profile control and water plugging agents at different temperatures

| SN | 70° C. | 80° C. | 90° C. | 100° C. |
|---|---|---|---|---|
| Example 3 | 45.5 | 55.6 | 58.3 | 47.8 |
| Example 4 | 28.7 | 35.2 | 36.7 | 25.2 |
| Example 5 | 36.4 | 46.5 | 48.2 | 35.1 |
| Example 6 | 18.6 | 21.2 | 20.6 | 15.2 |
| Example 7 | 26.3 | 31.2 | 32.4 | 25.8 |
| Example 8 | 17.7 | 19.6 | 20.1 | 15.5 |
| Example 9 | 32.3 | 45.7 | 44.6 | 43.8 |
| Example 10 | 14.5 | 15.2 | 15.0 | 15.4 |
| Example 11 | 23.1 | 28.6 | 30.5 | 22.8 |
| Example 12 | 17.5 | 19.3 | 18.6 | 18.4 |
| Example 13 | 22.8 | 26.5 | 28.9 | 21.2 |
| Comparative example 1 | 12.7 | 13.2 | 13.7 | 11.2 |

TABLE 2

Particle size distribution (nm) of self-growth gel particle profile control and water plugging agents at different temperatures

| SN | 70° C. | 80° C. | 90° C. | 100° C. |
|---|---|---|---|---|
| Example 3 | 1500-42000 | 2000-78000 | 1800-62000 | 1600-50000 |
| Example 4 | 1800-27000 | 2200-56000 | 2000-45000 | 2000-42000 |
| Example 5 | 1600-36000 | 2200-66000 | 1800-54000 | 2000-48000 |
| Example 6 | 1500-6000 | 1800-7500 | 1800-6600 | 2000-6000 |
| Example 7 | 1600-24000 | 2000-38000 | 1800-40000 | 2000-36000 |
| Example 8 | 1800-8500 | 2000-9000 | 2000-8600 | 2200-8000 |
| Example 9 | 1600-26000 | 1800-52000 | 2000-50000 | 2000-48000 |
| Example 10 | 1800-7000 | 2000-7000 | 2200-6500 | 2000-5500 |
| Example 11 | 2000-22000 | 2000-56000 | 2200-40000 | 2200-40000 |
| Example 12 | 2000-12000 | 2000-20000 | 2200-24000 | 2200-18000 |
| Example 13 | 2200-20000 | 2200-45000 | 2000-40000 | 2200-36000 |
| Comparative example 1 | 800-5000 | 1000-5500 | 1000-5000 | 900-4500 |

From the results in the examples, the comparative example and the tables 1 to 2, it can be seen that, the self-repairing gel prepared from the mussel bionic gel composition of the present disclosure has good shear repairing performance, and a blocky gel may implement self-repairing after being broken. The self-growth gel particle profile control and water plugging agent prepared from the self-repairing gel is low in initial apparent viscosity (3 mPa·s to 15 mPa·s), easy to inject and far in migration, and it is not easy for the agent to plug up a stratum near a well. At 80° C. to 90° C., a guarant viscosity of the profile control and water plugging agent increases remarkably, and gel particles in the profile control and water plugging agent have remarkable aggregation and growth effects in a simulated formation temperature and water salinity environment, so the agent is particularly applicable to a low-permeability fractured reservoir.

In examples 5 to 8, when a degree of hydrolysis and a weight-average molecular weight of the mussel bionic copolymer used and/or a degree of hydrolysis and a weight-average molecular weight of polyacrylamide in the mussel bionic compound used are not optimized, the increase of the guarant viscosity and the aggregation and growth effects of the gel particles of the prepared self-growth gel particle profile control and water plugging agents after aging under a simulated formation temperature and water salinity are not better than those when a degree of hydrolysis and a weight-average molecular weight are within a preferred range.

In examples 9 to 12, when a consumption amount of the mussel bionic copolymer used and/or a consumption amount of the mussel bionic compound used are/is not optimized, the increase of the guarant viscosity and the aggregation and growth effects of the gel particles of the prepared self-growth gel particle profile control and water plugging agents after aging under a simulated formation temperature and water salinity are not better than those when a consumption amount is within a preferred range.

In example 13, when oxidization modification was not performed on the mussel bionic catechol compound, the increase of the guarant viscosity and the aggregation and growth effects of the gel particles of the prepared self-growth gel particle profile control and water plugging agent after aging under a simulated formation temperature and water salinity are not better than those when oxidization modification was performed.

In Comparative example 1, when the mussel bionic copolymer in which a catechol group is not introduced is used, the increase of the guarant viscosity and the aggregation and growth effects of the gel particles of the prepared self-growth gel particle profile control and water plugging agent after aging under a simulated formation temperature and water salinity are not remarkable. This indicates that the gel and the profile control and water plugging agent that have good injection performance and shear repairing performance are not obtained when a catechol group is not introduced.

The foregoing describes the exemplary embodiments of the present disclosure in detail, but the present disclosure is not limited hereto. Various simple modifications can be made to the technical solutions of the present disclosure within the scope of the technical concept of the present disclosure, including combinations of various technical features in any other proper manner. These simple modifications and combinations should also be considered as the disclosures of the present disclosure and all fall within the protection scope of the present disclosure.

The invention claimed is:

1. A self-repairing gel, wherein the gel is formed, through aging and gelatinizing, by a composition comprising a mussel bionic copolymer and/or a mussel bionic compound, a cross-linking agent and water,
   wherein the mussel bionic copolymer comprises a structural unit A from a vinyl monomer and a structural unit B from a vinyl-containing mussel bionic catechol group monomer; and
   the mussel bionic compound comprises polyacrylamide and a mussel bionic catechol compound.

2. The self-repairing gel according to claim 1, wherein the mussel bionic copolymer has a degree of hydrolysis of 5 mol % to 28 mol %; a weight-average molecular weight of 7 million g/mol to 10 million g/mol; and a complete dissolution time shorter than 1.5 h.

3. The self-repairing gel according to claim 2, wherein the mussel bionic copolymer has a degree of hydrolysis of 10 mol % to 18 mol %; and a weight-average molecular weight of 8 million g/mol to 9 million g/mol.

4. The self-repairing gel according to claim 1, wherein polyacrylamide has a degree of hydrolysis of 5 mol % to 28 mol %; a weight-average molecular weight of 7 million g/mol to 15 million g/mol; and a complete dissolution time shorter than 1.5 h.

5. The self-repairing gel according to claim 4, wherein polyacrylamide has a degree of hydrolysis of 5 mol % to 17 mol %; and a weight-average molecular weight of 8 million g/mol to 12 million g/mol.

6. The self-repairing gel according to claim 1, wherein a consumption amount of the mussel bionic copolymer is 0.2 part by weight to 0.6 part by weight; a consumption amount of the mussel bionic compound is 0.2 part by weight to 0.6 part by weight; a consumption amount of the cross-linking agent is 0.6 part by weight to 1.5 parts by weight; and a consumption amount of the water is 97.9 parts by weight to 99.2 parts by weight.

7. The self-repairing gel according to claim 6, wherein a consumption amount of the mussel bionic copolymer is 0.25 part by weight to 0.4 part by weight; a consumption amount of the mussel bionic compound is 0.25 part by weight to 0.4 part by weight; a consumption amount of the cross-linking agent is 0.8 part by weight to 1.2 parts by weight; and a consumption amount of the water is 98.4 parts by weight to 98.95 parts by weight.

8. The self-repairing gel according to claim 1, wherein based on a total weight of the mussel bionic copolymer, a content of the structural unit A is 75 wt % to 90 wt %, and a content of the structural unit B is 10 wt % to 25 wt %; and based on a total weight of the mussel bionic compound, a content of polyacrylamide is 65 wt % to 85 wt %; and a content of the mussel bionic catechol compound is 15 wt % to 35 wt %.

9. The self-repairing gel according to claim 8, wherein based on a total weight of the mussel bionic copolymer, a content of the structural unit A is 85 wt % to 90 wt %, and a content of the structural unit B is 10 wt % to 15 wt %; and based on a total weight of the mussel bionic compound, a content of polyacrylamide is 75 wt % to 80 wt %; and a content of the mussel bionic catechol compound is 20 wt % to 25 wt %.

10. The self-repairing gel according to claim 1, wherein the vinyl-containing mussel bionic catechol group monomer is selected from one or more of compounds with a structure as shown in a formula (1),

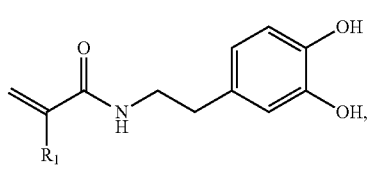

Formula (1)

wherein $R_1$ is —H or —CH$_3$;
the mussel bionic catechol compound is selected from one or more of compounds with a structure as shown in a formula (2),

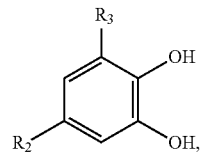

Formula (2)

wherein $R_2$ is any one of —COOH, —OH, —C$_n$H$_{2n}$NH$_2$, —(CHO)$_x$— and —C$_n$H$_{2n+1}$ and/or $R_3$ is —H or —OH;
wherein x is an integer from 1 to 6, and/or n is an integer from 1 to 12.

11. The self-repairing gel according to claim 10, wherein the mussel bionic catechol compound is selected from one or more of dopamine, tannin acid, catechin, ellagic acid and gallic acid;

the vinyl monomer is selected from one or more of acrylic acid, methacrylic acid, ethylacrylic acid, propylacrylic acid, butylacrylic acid, amylacrylic acid, hexylacrylic acid, acrylamide, methacrylamide, ethylacrylamide, propylacrylamide, butylacrylamide, amylacrylamide and hexylacrylamide; and the cross-linking agent is selected from one or more of water-soluble phenolic resin, polyethyleneimine and polypropyleneimine.

12. The self-repairing gel according to claim 11, wherein the mussel bionic catechol compound is selected from dopamine and/or tannin acid;

the vinyl monomer is selected from acrylamide and/or acrylic acid; and the cross-linking agent is selected from water-soluble phenolic resin and/or polyethyleneimine; and a weight-average molecular weight of the water-soluble phenolic resin is 5000 g/mol to 30000 g/mol; and a weight-average molecular weight of polyethyleneimine is 1500 g/mol to 10000 g/mol.

13. The self-repairing gel according to claim 1, wherein conditions of the aging and gelatinizing comprise: a temperature of 60° C. to 90° C., and a time of 24 h to 72 h.

14. A method for preparing the self-repairing gel according to claim 1, comprising the following steps:
(1a) in the presence of an initiator and a chain transfer agent, performing a copolymerization reaction with a vinyl monomer and a vinyl-containing mussel bionic catechol group monomer to obtain a mussel bionic copolymer; and/or
(1b) mixing an aqueous solution of a mussel bionic catechol compound and an aqueous solution of polyacrylamide to obtain a mussel bionic compound; and
(2) performing aging and gelatinizing on the mussel bionic copolymer and/or the mussel bionic compound and a cross-linking agent to obtain the self-repairing gel.

15. The method according to claim 14, wherein in the step (1a), a weight ratio of the vinyl monomer to the vinyl-containing mussel bionic catechol group monomer to the initiator to the chain transfer agent is (61-76):(7-12):(0.08-0.15):(0.2-0.5).

16. The method according to claim 14, wherein the initiator is selected from 2,2'-azobis[2-methylpropionamidine]dihydrochloride and/or 1,2-bis(2-(4,5-dihydro-1H-imidazol-2-yl)propan-2-yl)diazene dihydrochloride; and the chain transfer agent is selected from one or more of water-soluble dithiocarbonate, water-soluble xanthate and water-soluble trithiocarbonate.

17. The method according to claim 14, wherein in the step (1a), the copolymerization reaction is carried out at 55° C. to 70° C. for 4 h to 8 h.

18. The method according to claim 14, wherein in the step (1b), a weight ratio of the mussel bionic catechol compound to polyacrylamide is (5-10):(25-30).

19. The method according to claim 14, wherein in the step (2), a weight ratio of the mussel bionic copolymer and/or the mussel bionic compound to the cross-linking agent is (0.2-0.5):(6-1.2).

20. A self-growth gel particle profile control and water plugging agent, wherein the profile control and water plugging agent is formed, through blending and shearing, by the self-repairing gel according to claim 1 and water.

* * * * *